Patented Aug. 22, 1944

2,356,382

UNITED STATES PATENT OFFICE 2,356,382

PROCESS FOR THE PURIFICATION OF PHOSPHATIDES

Aage Christiansen, Russhov, near Aarhus, Denmark; vested in the Alien Property Custodian No Drawing. Application March 6, 1940, Serial No. 322,481. In Denmark April 11, 1939

2 Claims. (Cl. 260—403)

The present invention relates to a process for the purification of phosphatides separated from vegetable oils.

The raw phosphatide that may be obtained from vegetable oils by precipitation with suitable quantities of water and perhaps other chemicals is a paste-like emulsion containing the phosphatide, water, chemicals, oil and impurities. The oil and impurities cannot be separated by treatment in a centrifuge, nor by other mechanical methods, but require the addition of chemical reagents, in order to be removed.

In order to purify such raw phosphatide, it has been proposed to extract the dried phosphatide with oil-dissolving agents and to wash with such substances as ethyl alcohol, methyl alcohol, acetone and the like in which oils are soluble and lecithin is not soluble.

These purifying methods, however, require the use of relatively large quantities of the purifying agents concerned, frequently several times the quantity by weight of the phosphatide. For this reason these processes become complicated and expensive, especially in view of the fact that recuperation of the cleaning agent is an economic necessity. The process disclosed in the Danish Patent No. 52,738 requires the addition of large quantities of alcohol, considerable quantities of water, acids and salts. In this case the quantity of chemicals to be handled will be especially large and the process becomes complicated for the mixture divides itself into three layers, viz.: one layer mainly contains phosphatides, a second layer contains oil, while a third one contains phosphatides and large quantities of undesirable substances whose removal is necessary if the phosphatide from this layer is to be obtained. The removal processes are lengthy and involve the danger of decomposing the phosphatide.

I have discovered that after the addition of relatively small quantities of one or more of such cleaning agents as alcohols and ketones, the precipitated water containing raw phosphatides may be caused to melt. It may be necessary to heat the mass in order to bring about this melting.

The fused mass may then be separated, either by being left alone or by being treated at a suitable temperature in a centrifuge. Such separation only yields two layers:

(1) A layer containing oil, a small amount of cleaning agent and the impurities.

(2) A liquid layer containing practically all the pure phosphatides present in the raw phosphatides.

The quantity of cleaning agent to be added, in order to cause the paste-like phosphatide mass to pass into a liquid state must be adjusted according to the nature and conditions of manufacture of the raw phosphatide, and may vary from 1 to 33% of the pure phosphatide. If too little of the cleaning agent be used, no useful separation will be effected, and if more than the optimum quantity of the agent be used, a coagulation will take place so that after the mixture has been left alone or has been treated in a centrifuge, the result will be an incomplete purification and a separation into three layers:

At the top: an oil-containing layer,

Midways: water, cleaning agent and a small quantity of phosphatide,

At the bottom: an imperfectly purified mass of phosphatide.

The layer of phosphatide (layer 2) purified according to the present process may either be dried as it is, or it may be further cleaned by being mixed with oils or fatty substances, and owing to the presence of the cleaning agent, the oil and fat may again be separated together with the absorbed impurities by being left alone or by being treated in a centrifuge. Heat may be applied if necessary.

This combination of the cleaning agent and oil causes the added oil to absorb colouring substances, fatty acids, tasting substances and other impurities from the phosphatides and further the quantity of phosphatide may be practically completely gained.

Example

To the ground-nut raw phosphatide, separated from raw ground-nut oil by means of water and containing about 40% of pure phosphatide, about 10% of ethyl alcohol is added, and is mixed while heating to 60 to 70° C. causing the mass to melt, after which it is separated, by being left alone or by treatment in a centrifuge, into:

(1) A lighter oil-containing layer containing impurities and a small quantity of alcohol and (2) A heavier liquid layer consisting of purified phosphatide, some water and the main part of the alcohol added.

After the separation, this layer is mixed with 33% of refined vegetable oil, and the mixture is heated to from 60 to 70° C., after which it is separated by being left alone or by treatment in a centrifuge into:

(1) An oil-containing layer in which the impurities and a small quantity of alcohol have been absorbed, and (2) A liquid layer containing, besides water and alcohol, also a more thoroughly purified phosphatide.

Having thus described my invention, what I claim is:

1. A process for producing pure phosphatide from a raw phosphatide containing about 40% of pure phosphatide, water and impurities, said process comprising the steps of mixing the raw phosphatide with about 10% of ethyl alcohol, heating the mixture to a temperature between 60° C. and 70° C. until it melts, centrifuging the molten mixture to separate it into a lighter liquid layer containing most of the water, most of the impurities and a small quantity of alcohol and a heavier liquid layer consisting of purified phosphatide, some water and the main part of the alcohol added, and extracting the pure phosphatide from said heavier liquid layer.

2. A process for producing pure phosphatides from raw phosphatides containing a certain percentage of pure phosphatides, water and impurities, said process comprising the steps of treating the raw phosphatide with a liquid miscible with water and with oils, said liquid being an alcohol miscible with water and with oils, said liquid being used in a quantity equal to from 1 to 33% of the pure phosphatide contained in said raw phosphatide, heating the treated phosphatide until it melts, separating the treated and heated mass into two liquid layers of different specific weight, the heavier layer containing the pure phosphatide and extracting the pure phosphatide from the heavier liquid layer.

AAGE CHRISTIANSEN.